Dec. 11, 1951  J. J. TWARDOWSKI  2,578,615
MICROMETER MEASURING AND SCRIBING TOOL
Filed May 27, 1949  3 Sheets-Sheet 1
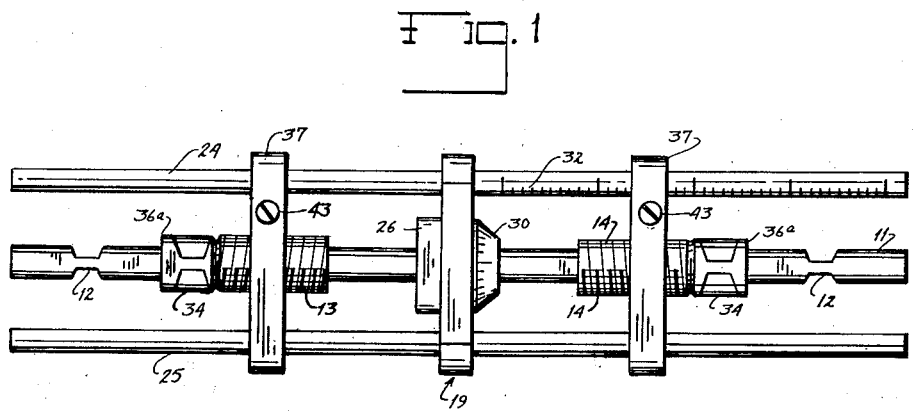
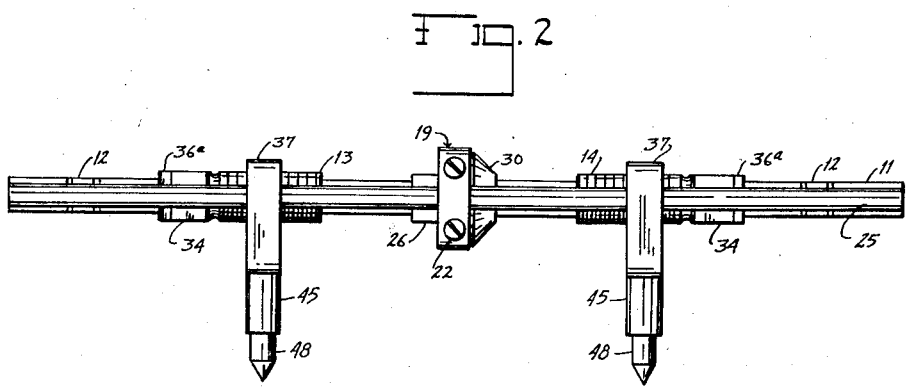
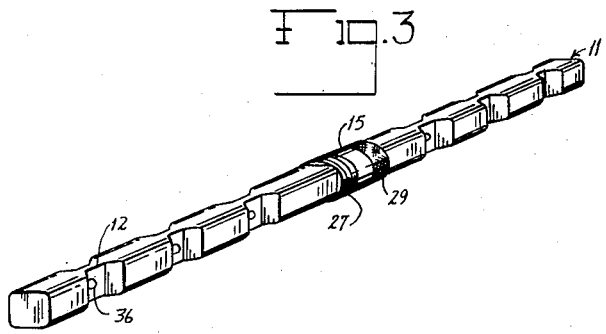
INVENTOR.
JOHN J. TWARDOWSKI
BY
HIS ATTORNEY Dec. 11, 1951     J. J. TWARDOWSKI     2,578,615
MICROMETER MEASURING AND SCRIBING TOOL
Filed May 27, 1949     3 Sheets-Sheet 2
Fig. 4
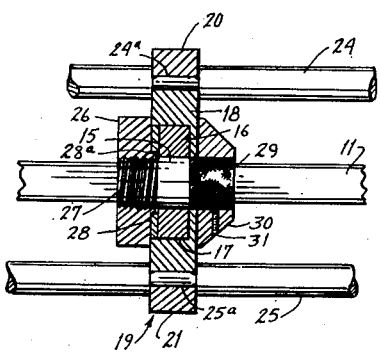
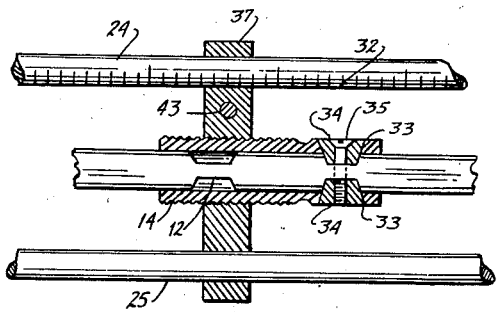
Fig. 5
Fig. 6
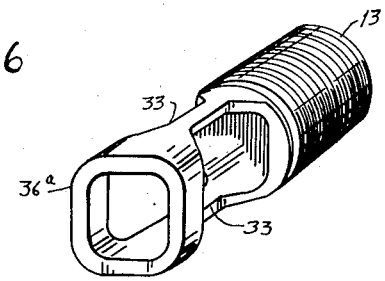
INVENTOR.
JOHN J. TWARDOWSKI
BY
HIS ATTORNEY Dec. 11, 1951 J. J. TWARDOWSKI 2,578,615
MICROMETER MEASURING AND SCRIBING TOOL
Filed May 27, 1949 3 Sheets-Sheet 3
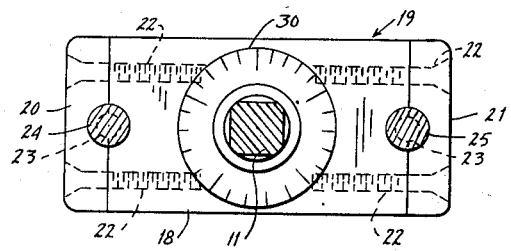
INVENTOR.
JOHN J. TWARDOWSKI
BY
HIS ATTORNEY Patented Dec. 11, 1951

2,578,615

UNITED STATES PATENT OFFICE 2,578,615

MICROMETER MEASURING AND SCRIBING TOOL

John J. Twardowski, Greenvale, N. Y.

Application May 27, 1949, Serial No. 95,696

5 Claims. (Cl. 33—159)

This invention relates in general to instruments or tools for the precision measurement of diameters and/or scribing of surfaces, and has as its principal object, the provision of certain desired improvements over the expanding tool described in my Patent No. 2,383,028, dated August 21, 1945.

A more particular object of the invention is the provision of a micrometer divider or scribing instrument of an improved design and construction, especially adapted to assure and maintain accuracy of measurement and compensate for wear while permitting a reduction in cost of manufacture.

Another object is to provide a precision measuring instrument for the micrometer scribing of surfaces, and having novel detachable and replaceable means for purposes of adjustment, convenient replacement, if required, and of a design facilitating its production on a quantity basis.

A further object is the provision of a micrometer measuring instrument, wherein the adjustable and threaded components and the scribing elements may be quickly and conveniently compensated for possible wear, or replaced, if desired.

Other objects and advantages of the present design and construction will appear as the description proceeds, and will be more fully understood when taken in connection with the accompanying drawings, wherein:

Figure 1 is a plan view of a micrometer measuring or scribing tool embodying the invention;

Fig. 2 is a side elevational view thereof;

Fig. 3 is a detail, perspective view showing the central operating bar detached from the assembly shown in Fig. 1;

Fig. 4 is an enlarged, fragmentary, detail view, partly in section, and showing elements associated with the vernier dial;

Fig. 5 is an enlarged, fragmentary, detail view, partly in section, and showing one of the novel detachable, threaded sleeve members and associated parts which cooperate to move the scriber holders while providing means compensating for wear or lost motion;

Fig. 6 is an enlarged, perspective view of one of the threaded sleeves, shown in section in Fig. 5, and from which the insertable elements have been removed;

Fig. 7 is an elevational view, partly in section, of the block to which the vernier dial scale is operatively attached; and Fig. 8 is a view similar to Fig. 7, but showing one of the adjusting and compensating blocks which carry a scriber element.

Referring now to the drawings in particular, wherein similar characters of reference indicate corresponding parts in the several views of the preferred form of the invention, the numeral 11 designates the manually operable, central adjusting bar, which is substantially of rectilinear configuration in cross section (Fig. 7) and having two opposite sides provided with a series of beveled recesses, as at 12, as best shown in Figs. 1 and 3. As hereinafter described, these recesses provide means for the convenient positioning and securing of the removable and relatively adjustable threaded sleeves 13, 14, which are oppositely threaded and which form one of the features of the invention and which coact with the adjusting bar 11 to move the carrier blocks having the scribing members.

A bearing surface 15 is formed at approximately the center of the bar 11 to accommodate a bushing or bearing 16 (Fig. 4), the bearing in turn being press fitted in a pocket 17 formed in the body portion 18 of a sectional block 19. The block 19, as best shown in Fig. 7, includes the main body portion 18 to each end of which a clamping portion or plate 20, 21 is detachably secured, as by the screws 22. Semicircular grooves, in the opposed edges of the said body portion and plates, provide holes, as at 23, which clampingly receive reduced portions 24a and 25a formed on longitudinally extending guide bars 24, 25. The reduced portions 24a and 25a serve to maintain the block 19 in a fixed central position with respect to the guide bars. An adjusting nut 26 mounted on a central threaded portion 27 of the adjusting bar 11, is normally in abutment with a washer 28 directly engaged against the outer face of the said bearing and the adjacent inner periphery of the pocket, and having an opening adapted to accommodate an annular shoulder 28a on the said nut. This shoulder or extension 28a affords the adjusting nut a further degree of rotation, when desired.

The adjusting bar 11, which in cross section, as seen in Fig. 7, has a rectilinear configuration, is knurled as at 29, the latter receiving a vernier or micrometer dial 30 which is secured thereon by a set screw 31. By inspection of Fig. 1, it will be seen that the guide bar 24 is provided with a calibrated scale 32 which provides a rough measuring indication of a surface or diameter to be scribed or measured, the vernier dial then affording a micrometer indication of the extent of the dimension.

The removable relatively adjustable sleeves 13, 14, mentioned above, are individually shaped to provide beveled, cut out portions, as at 33, adapted to receive correspondingly beveled plugs or inserts 34, which are fastened thereto by set screws, as at 35 threaded into holes 36 formed in the beveled portions of the adjusting bar 11. By the means last recited, it will be seen that these adjusting sleeves may be quickly secured to the adjusting bar 11 after being located at the positions suitable for measuring surfaces of diversified extent. Each adjusting sleeve 13, 14 has an extended socket portion, as at 36a, and has its threaded portion received in a correspondingly threaded opening provided in each of the similar scriber-carrying blocks 37, whose structure is best shown in Fig. 8, and which includes holes 38, 39 slidably accommodating the longitudinally extending guide bars 24, 25, respectively, mentioned above. By further inspection of Fig. 8, and as another feature of this invention, each carrier block 37 is formed with a slot 40 extending from its outer edge and communicating with a central opening 41, which accommodates the adjacent sleeve 13 or 14. Each opening 41 is threaded with the threads assuming a direction corresponding to that of the threads on the sleeve received therein. Thus, the openings 41 are oppositely threaded. The periphery of the opening 41 is widened or recessed at one point adjacent to an upper portion of the block, as at 42, with a view to providing resiliency when making adjustments or taking up lost motion of each block relative to its cooperating adjusting sleeve. The means for adjusting or taking up lost motion referred to, include a screw 43 which passes through a bolt hole extending through the block and through the opposed surfaces adjoining the slot 40, the end of the said screw being engaged by a nut 44 secured in a pocket 44' in the lower edge of the block. When the screw 43 is turned, it will be understood, the portions of the block on either side of the slot 40 may be slightly separated or brought together, so that the adjacent adjusting sleeve within the opening 41 may be operatively and clampingly engaged. It will now be apparent that if lost motion, relatively to the block and the adjacent adjusting sleeve, should occur over a long period of use, this may be taken up by the screw 43 and nut 44. Or, if manipulation of the adjusting bar 11 is too stiff or difficut, the screw 43 will be turned to secure the desired tension. The blocks 37 have projecting lugs or sockets 45, each formed with a tapered pocket, as at 46, to receive a corresponding inner taper 47 on a scriber member 48, detachably insertable therein. By the means illustrated, the scribers 48 may be quickly withdrawn and repointed, and then instantly replaced, the coacting beveled or tapering surfaces affording a secure retention of the scriber, while permitting its ready release, when desired.

The function and general mode of operation of the device has been in large measure indicated above, but may be summarized as follows:

Assuming that it is desired to scribe or measure a surface, the adjusting nut 26 will be turned sufficiently to permit the bar 11 to be rotated, thereby conveying the carrier blocks 37 with their scribers to the points or lines desired. The scale 32 will then denote approximately the distance between the scriber points while the vernier scale will show the number of thousandths of an inch to be added to the rough scale measurement.

With reference to the adjusting sleeve members 13, 14, these may be put under the proper tension by the semi-split carrier blocks 37 to maintain a snug fit while permitting reasonable ease of manipulation of the adjusting bar 11.

The adjustable sleeve members 13, 14, in addition to their normal function of conveying the scriber-carrying blocks 37 towards and away from each other, provide, as mentioned above and in combination with their adjacent split carrier blocks, a convenient method and means of eliminating lost motion caused by wear, and providing the amount of manipulating friction the individual user of the tool desires.

While certain preferred embodiments of the invention are hereinbefore set forth, it is to be clearly understood that the invention is not to be limited to the exact construction illustrated and described because various modifications of the details may be provided in putting the invention into practice within the purview of the appended claims.

What is claimed is:

1. In a measuring and scribing tool of the kind described, in combination, scribing means, parallel supporting means for said scribing means, guiding means to maintain the supporting means in spaced, operable relation, a scale on said guiding means, a longitudinally extending member protruded through the supporting means, other means connected to the member and supporting means and rotatable with the member to move said supporting means, said other means being longitudinally adjustable on the said member, and a vernier dial secured to the member and coactable with the scale to indicate measuring values.

2. In a device of the kind described, a pair of scribing means, a support for each of said means, said supports being arranged in parallel relation, a pair of members arranged in spaced relation and slidably receiving said supports, a rotatably threaded bar arranged between said pair of members and passing through threaded opening in said supports, a scale arranged on one of the pair of members, a vernier dial mounted on the bar and coactable with the scale to indicate measuring values, means secured to and longitudinally adjustable on the bar and coactable with each of said supports; whereby when said bar is turned, said supports and scribing means will be moved and said dial and scale will denote the distance between the scribing means, and means on each of said supports for compensating for lost motion between said supports and said member.

3. In a measuring and scribing tool of the kind described, a pair of guide bars arranged in spaced parallel relation with respect to each other, a pair of blocks slidably arranged on said guide bars, each of said blocks being provided with an opening therein, a scriber secured to each of said blocks, a sleeve engaged in each of said openings, means on each block to expand and contract the opening therein, a longitudinally extending member whereon said sleeves are longitudinally adjustable, a bearing block turnably receiving said member, a scale on one of the guide bars, and a vernier dial fastened to the member.

4. In a measuring and scribing tool of the kind described, a pair of guide bars arranged in spaced parallel relation, a pair of blocks slidably arranged in spaced parallel relation on said guide bars, each of said blocks being provided with a threaded expansible opening therein, scribing means secured to each of said blocks, a socket arranged on each of said blocks and effective to detachably retain one of the scribing means, a sleeve threadedly engageable in the expansible opening and having cut out portions, elements insertable in said cut out portions, a bar extending through the expansible openings, said elements being detachably secured to the last-named bar, and a scale arranged on one of the guide bars and coactable with a vernier on said last-named bar.

5. In a measuring and scribing tool of the kind described, in combination, a pair of carrier blocks arranged in spaced parallel relation, each of said carrier blocks being provided with an expansible threaded opening therein, scribing means detachably mounted on each of said carrier blocks, a pair of guide bars slidably accommodating the carrier blocks, means to expand and contract said openings, said means including threaded means secured to the block and a slot extending from an outer edge of the block and communicating with the opening, said slot being contractable by said threaded means, a sleeve threadedly engaged in each of said expansible openings, a bar extended through said blocks and having cut out portions, said sleeves having cut out portions registering with the cut out portions of the bar, insertable elements positioned in the registering cut out portions in the last named bar and said sleeve, means to detachably secure the blocks and consequently the sleeves in fixed relation to said last named bar, a sectional block secured to said guide bars and between said carrier blocks, a bearing member in the sectional block and rotatably supporting said bar, and scale means on one of the guide bars and the bar having cut out portions.

JOHN J. TWARDOWSKI.

REFERENCES CITED

The following references are of record in the file of this patent:

UNITED STATES PATENTS

| Number | Name | Date |
| --- | --- | --- |
| 306,278 | Patch | Oct. 7, 1884 |
| 1,007,229 | Nielsen | Oct. 31, 1911 |
| 2,383,028 | Twardowski | Aug. 21, 1945 |

FOREIGN PATENTS

| Number | Country | Date |
| --- | --- | --- |
| 595,918 | Great Britain | Dec. 23, 1947 |